United States Patent [19]

Ziegler

[11] 4,196,947

[45] Apr. 8, 1980

[54] ADJUSTABLE FOUR POINT CONTACT BEARING

[75] Inventor: Edward J. Ziegler, Michigan Center, Mich.

[73] Assignee: Clark Equipment Company, Buchanan, Mich.

[21] Appl. No.: 879,840

[22] Filed: Feb. 22, 1978

[51] Int. Cl.² ............................................. F16C 19/10
[52] U.S. Cl. .................................. 308/221; 308/227; 308/235; 308/236
[58] Field of Search ............... 308/189 A, 207 A, 119, 308/206, 196, 195, 219, 197, 220–222, 227–231, 235, 236, 244, 174, , 216

[56] References Cited

U.S. PATENT DOCUMENTS

| 718,376 | 1/1903 | O'Reilly | 308/189 A |
| 3,361,500 | 1/1968 | Pöhler | 308/216 |
| 3,802,755 | 4/1974 | Schluter et al. | 308/227 |

FOREIGN PATENT DOCUMENTS

| 214070 | 7/1941 | Fed. Rep. of Germany | 308/221 |
| 326286 | 1/1958 | France | 308/236 |

*Primary Examiner*—Douglas C. Butler
*Attorney, Agent, or Firm*—Mack L. Thomas

[57] ABSTRACT

In a known four point contact rolling element bearing of the type used in low speed applications, one of the inner and outer races is provided with a single gap as well as a peripheral conical surface that corresponds with and is juxtaposed on a corresponding peripheral conical surface on one of at least two relatively adjustable but fixedly interconnected race retainer portions associated with the split race, with a plurality of shims between these race retainer portions permitting the adjustment of the axial spacing between the retainer portions and controlling the degree of deflection of the split race toward the other bearing race for preloading or taking up undesired bearing wear.

11 Claims, 7 Drawing Figures

ADJUSTABLE FOUR POINT CONTACT BEARING

BACKGROUND OF THE INVENTION

1. Field of the Invention

The field of art to which this invention pertains includes rolling element bearings and more specifically four point contact bearings of the type used in low speed oscillating and turntable-type applications.

2. Description of the Prior Art

As is known from the prior art, in a four point contact or type X bearing, the groove in each of the one-piece or integral inner and outer races has two radii whose centers are offset from the plane of the ball centers, thus making possible four contact points between a ball and the raceways. The deep grooves in the bearing races combined with the four point contact geometry enables this type of bearing to resist any combination of radial, thrust and moment loading. One supplier of bearings of this type is the Kaydon Bearing Division of the Keene Corporation of Muskegon, Michigan.

Four point contact bearings are normally supplied with diametral clearance; however, this bearing is not dependent upon this clearance for its nominal contact angle and thrust capacity. On the contrary, where thrust or moment loading is considerable, the clearance should be minimized in order to prevent the angle of contact from becoming excessive. Furthermore, for many applications requiring greater stiffness, four point contact bearings are furnished by the manufacturer with an internal preload which is accomplished by using balls larger in diameter than the space provided between the raceways. In this instance, the balls and raceways have some elastic deformation without the presence of an external load.

Prior art bearings of this type require precision grinding and assembly in order to meet these criteria. Thus, normally, bearing preload is the function of the precision machining of the inner and outer races.

SUMMARY OF THE INVENTION

In carrying out the present invention, the two preferred embodiments thereof alleviate the costly and exact machining process as well as the selective assembly of four point contact bearings.

A principal object of the improved bearing of this invention is the ability to shim one of the race retainer assemblies in order to achieve a bearing preload. Furthermore, a further object of the present invention is that the ability to shim allows for bearing wear, in that after a reasonable number of hours of bearing life, the resultant wear can be compensated for by changing the number of shims in the race retainer assembly.

In order to achieve the desired preload or to take up bearing wear, one of the inner and outer races is provided with a single gap, with this race thus assuming the properties of an elastic open ring. This split race further has a peripheral conical surface on that portion of its peripheral surface that faces away from the rolling element path of the bearing. The race retainer associated with the split race has at least two relatively adjustable but fixedly interconnected portions that are axially separated via spacer means that preferably takes the form of a plurality of shims interposed between the race retainer portions for physically separating same. One of the race retainer portions is provided with a peripheral conical surface corresponding with and juxtaposed on the peripheral conical surface of the split race retainer. The interaction of these conical surfaces results only in a radial contact between this race retainer portion and the split race. On the other hand, there is only axial contact between the split race and the other of the at least two race retainer portions associated with the split race.

The degree of deflection of the split race, be it the inner or the outer, via the interaction of the juxtaposed conical surfaces on the split bearing race and its associated retainer, can be controlled by varying the spacer means between the spaced split race retainer portions. For example, removal of an annular shim from between the split race retainer portions will deflect the slotted race toward the other or closed bearing race.

The two preferred embodiments of this invention disclose the use of split outer and inner bearing races, respectively.

The principal objects, features and advantages of this invention will be more readily understood by persons skilled in the art when following the detailed description in conjunction with the several drawings.

DESCRIPTION OF THE PREFERRED EMBODIMENTS

Figure 1:
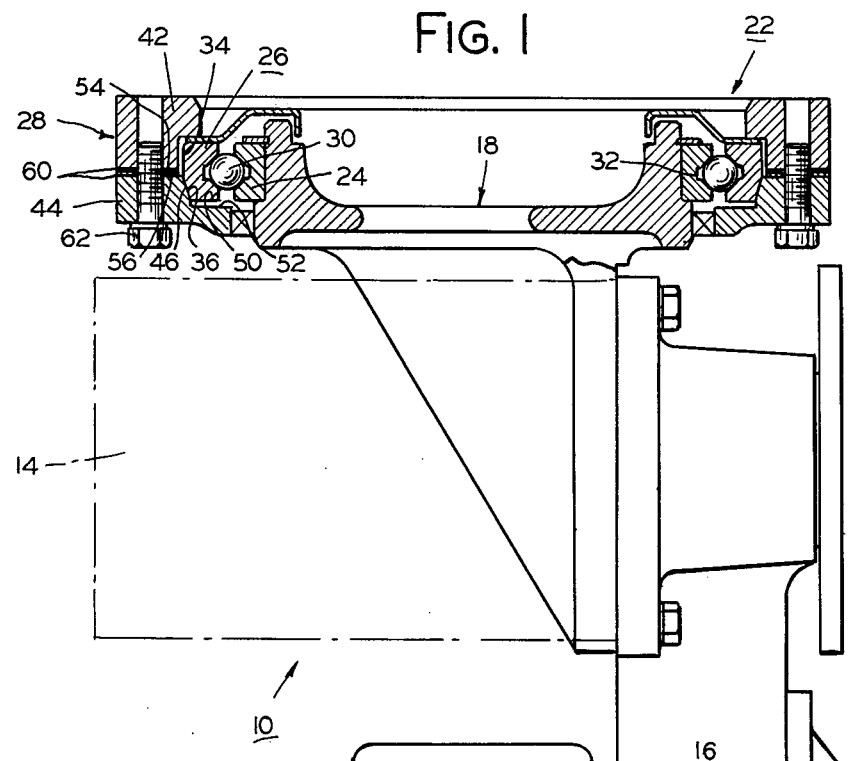
FIG. 1 is a front elevational view of a ground engaging drive-steer wheel that is pivotally supported, relative to a frame, via a rolling element bearing, shown in section, that incorporates the present invention.

Referring now in detail to the drawings, particularly FIG. 1, the reference numeral 10 generally denotes a drive unit, one end of which is supported on a ground engaging drive-steer wheel 12. Wheel 12 is powered by any desired type of drive motor, schematically represented at 14, with wheel 12 having a suitable driving connection with drive motor 14 through any suitable type of gearing contained within gear case 16.

The upper end of drive unit 10, i.e., drive motor 14 and a portion of gear case 16 are secured to a bracket member 18 that is fixedly secured to the inner race 24 of a known type of four point contact rolling element turntable bearing generally denominated by reference numeral 22. Outer race 26 of bearing 22 is secured by an outer race retainer assembly 28, to be more fully discussed hereinafter, with retainer assembly 28 in turn being fixedly secured to any type of desired frame (not shown).

Drive unit 10 which is pivotable around a vertical axis relative to retainer assembly 28, via bearing 22, finds utility, for example, in power operated hand lift trucks of the type shown and described in detail, for example, in U.S. Pat. No. 3,183,989, issued on 18 May 1965, in the name of G. J. Trusock et al. It should be understood at this time that the utility or use of bearing 22 is, of course, not limited to the aforementioned turntable-type application, but can find utility in oscillation type applications as, for example, in pivot steering or trunnion applications under low speed conditions.

Figure 3:
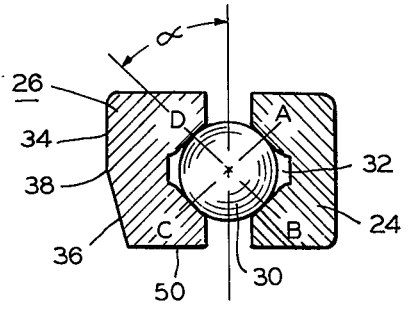
FIG. 3 is an enlarged sectional view taken along line 3—3 of FIG. 2.

Referring now to FIG. 3, an axial force applied to the inner race from right to left is passed from inner race 24 to ball 30 at point B. Thereafter, it is transmitted through rolling element or ball 30 to point D where it passes into outer race 26 and its associated support structure. The line of action BD forms a nominal angle $\alpha$ with the radial centerline of the bearing. Due to the elastic deformation of ball 30 and the race grooves along the load-transmission line, the ball load is relieved at points A and C, thereby permitting smooth rotation around an axis perpendicular to line BD. When an axial force is applied to outer race 26 from left to right, a similar transmission of load occurs between points D and B. Due to its ability to resist radial, thrust and moment loads in any combination, the four point contact bearing is often able to replace two bearings, such as, for example, a pair of angular contact ball bearings, a pair of tapered roller bearings, or a combination of thrust and radial bearings, either ball or roller.

A primary feature of improved bearing 22 of this invention is the ability to shim the outer race retainer assembly 28 in order to achieve a bearing preload. Furthermore, the ability to shim allows for bearing wear, in that after a reasonable number of hours of bearing life, the resultant wear can be compensated for by removing the appropriate thickness shim.

As both shown in FIG. 1, and more clearly in FIG. 3, it should be noted that the outer peripheral surface of outer race 26 has a generally cylindrical surface 34 that merges into an inwardly directed conical or tapered surface 36 starting at line 38. As shown in FIG. 1, outer race retainer assembly 28 is made up of a generally annular upper portion 42 and a generally annular lower portion 44, with the latter having a conical or tapered surface 46 corresponding and juxtaposed on conical surface 36 of outer race 26. It should also be noted that there is no radial contact between retainer upper portion 42 and cylindrical surface 34 of outer race 26 and similarly, there is no axial contact between lower horizontal surface 50 of outer race 26 and facing horizontal surface 52 of lower retainer portion 44. If desired, the entire outer peripheral surface of outer race 26 could be conical as long as there is no contact between it and upper retainer portion 42. Interposed between lower surface 54 of retainer upper portion 42 and upper surface 56 of lower retainer portion 44 are a plurality of shims 60. A plurality of machine bolts 62 are utilized for uniting retainer portions 42 and 44 into assembly 28 with shims 60, however, physically separating retainer portions 42 and 44. It should be understood that the number of machine bolts used for securing together upper and lower retainer portions 42 and 44 is a function of the side loading that bearing 22 must withstand, i.e., the number of bolts 62 depends upon the specific design of the bearing in terms of its required load carrying ability.

Figure 4:
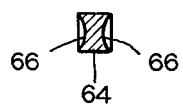
FIG. 4 is a sectional view of a spacer used between the rolling elements of the improved bearing of this invention.
Figure 2:
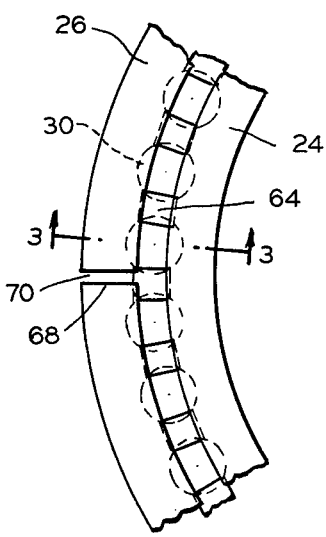
FIG. 2 is a partial top view of a portion of the inner and outer bearing races of the present invention.

Each one of multiple shims 60 can, of course, be split diametrically or can be segmented so that each shim 60 can be added or removed in sections, thereby avoiding complete disassembly of bearing 22 and avoiding accidental release of rolling elements or balls 30. As best seen in FIGS. 2 and 4, balls 30 are separated via spacer means 64 which preferably take the shape of a cylinder whose end surfaces are provided with opposed relief areas 66 having the shape of a spherical segment corresponding to the spherical segments of these portions of balls 30 adapted to fit therewithin, i.e., areas 66 fit the contour of ball 30.

Turning now to FIG. 2, it will be noted that bearing outer race 26 is split at 68 and thus provided with a single axial slot or gap 70, the width of which is a function of the preload desired on the particular bearing. Basically, outer race retainer lower portion 44 contacts outer bearing race 26 via juxtaposed conical surfaces 46 and 36, respectively. This conical contact forces outer race 26 inwardly toward the ball path 32, thereby crowding balls 30 against inner race 24. Slot 70 in outer race 26 allows outer race 26, which thus assumes the properties of an elastic open ring, to flex inwardly or outwardly depending on the load exerted by the race retainer clamping force from the exterior of the bearing or the load applied by balls 30 reacting against inner race 24.

Therefore, it should be understood that the present design readily permits shimming of outer race retainer assembly 28 so as to achieve bearing preload by contacting the outer race through a conical diameter and forcing the outer race toward bill path 32. Flexing of the outer race is permitted by slotting the outer bearing race. The present invention alleviates the exact and costly dimensional machining as well as selective assembly of bearings of this type. Preload can be achieved and bearing wear may be compensated for by utilizing the shims so as to control the degree of deflection of the outer race via conical surfaces 46 and 36. It should be understood at this time that removal of an annular shim 60 from between retainer portions 42 and 44 will, upon the subsequent, tightening of machine bolts 62, inwardly deflect bearing outer race 26.

The degree of taper or angle of conical surfaces 36 and 46 depends, of course, on the amount of the desired deflection of outer bearing race 26. At the same time, the similar reasoning holds forth for the thickness of each of shims 60. Slot or gap 70 in elastic open ring outer race 26 may be perpendicular or oblique relative to the ball path.

Figure 5:
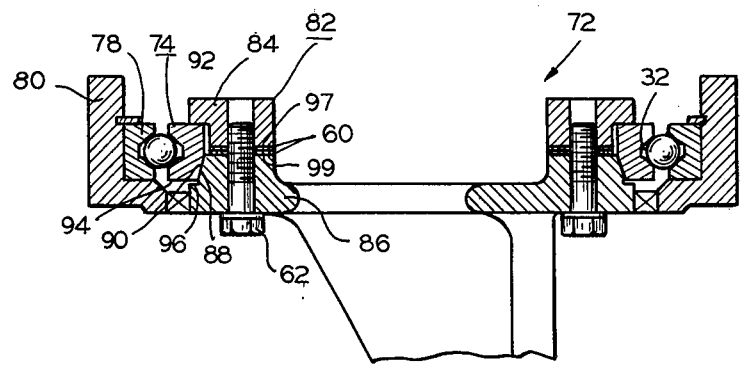
FIG. 5 is a sectional view of a rolling element bearing that incorporates a further embodiment of the present invention.
Figure 6:
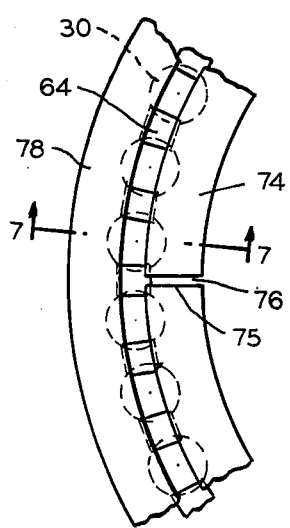
FIG. 6 is a partial top view of a portion of the inner and outer bearing races of the FIG. 5 embodiment.
Figure 7:
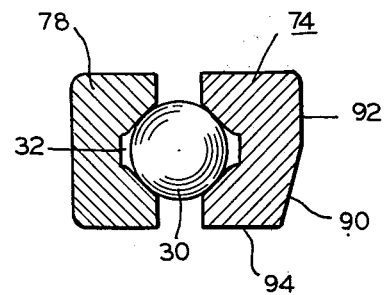
FIG. 7 is an enlarged sectional view taken along line 7—7 of FIG. 6.

Referring now to the further embodiment of the present invention shown in FIGS. 5–7, the reference numeral 72 denominates another four point contact rolling element turntable-type bearing that basically varies from previously described bearing 22 in that the former has an adjustable inner race 74. Thus, the design of bearing 72 is substantially similar to that of bearing 22 except that the latter utilizes an adjustable outer race 26. The utility and design criteria of bearing 72 are substantially similar to those previously described with reference to bearing 22 and will, therefore, not be repeated.

It will be noted, in FIG. 6, that inner bearing race 74 is split at 75 and is thus provided with a single axial slot or gap 76 in a manner similar to that of previously described outer race 26 of bearing 22. Outer race 78 is fixedly secured to an outer race retainer member 80 which in turn is fixedly secured to any type of desired frame (not shown). Inner race 74 is secured to an inner race retainer assembly 82 that includes generally annular upper portion 84 and a generally annular lower portion 86, with the latter having a conical or tapered surface 88 corresponding and juxtaposed on conical surface 90 of inner race 74. It should also be noted that there is no radial contact between retainer upper portion 84 and cylindrical surface 92 of inner race 74 and similarly, there is no axial contact between lower horizontal surface 94 of inner race 74 and the facing horizontal surface 96 of retainer lower portion 86.

Interposed between lower surface 97 of retainer upper portion 84 and upper surface 99 of retainer lower portion 86 are a plurality of shims 60 previously described with reference to bearing 22. A plurality of machine bolts 62 are utilized for securing together retainer portions 84 and 86 as well as confining shims 60 therebetween. Bearing 72, similarly to bearing 22, also utilizes rolling elements or balls 30 that are separated via spacer means 64.

Basically, inner race retainer lower portion 86 contacts inner bearing race 74 via juxtaposed conical surfaces 88 and 90, respectively. This conical contact forces inner race 74 outwardly toward ball path 32, thereby crowding balls 30 against outer race 78. Slot 76 in inner race 74 allows inner race 74, which thus assumes the properties of an elastic open ring, to flex outwardly or inwardly depending on the load exerted by the race retainer clamping force from the interior of the bearing or the load applied by balls 30 reacting against outer race 78.

Therefore, it should be understood that the design of the embodiment shown in FIGS. 5–7 readily permits shimming of inner race retainer assembly 82 so as to achieve bearing preload by contacting the inner race through a conical diameter and forcing the inner race toward the ball path. Flexing of the inner race is permitted by slotting the inner bearing race. Preload can be achieved and bearing wear may be compensated for by utilizing the shims so as to control the degree of deflection of the inner race via conical surfaces 88 and 90. It should be understood at this time that removal of an annular shim 60 from between bearing retainer portions 84 and 86 will, upon the subsequent tightening of machine bolts 62, outwardly deflect bearing inner race 74.

It should be clear at this time that both embodiments of the present invention alleviate the exact and costly machining process as well as the selective assembly of four point contact bearings. Proper preload can be achieved and bearing wear may be compensated for by splitting either the outer race (FIGS. 1–4) or by splitting the inner race (FIGS. 5–7) so as to control the degree of deflection of the split race, be it inner or outer, via the interaction of juxtaposed conical surfaces on the split bearing race and its associated retainer. Removal of an annular shim 60 from between the upper and lower race retainer portions will upon the subsequent tightening of machine bolts 62 deflect the slotted race toward the other or closed ring bearing race. A perusal of FIG. 1 should make it clear that split race 26 could be inverted along with retainer assembly 28 so that bolts 62 would be vertically downwardly directed. The same inversion can be applied to the FIG. 5 embodiment. One skilled in the art will also realize that, for example, instead of having a race retainer assembly that takes the form of separate upper and lower retainer portions, the race retainer assembly associated with the split race could also take the form of diametrically split retainer portions. These split retainer portions would be bolted together but have their opposed ends spaced apart via two separate pluralities of shims. The removal and addition of shims for outer and inner race retainer assemblies, respectively, would permit deflection of the split race toward the ball path.

From the foregoing, it is believed that those familiar with the art will readily recognize and appreciate the noval concepts and features of the present invention. The definition of rolling element bearings, of course, also includes roller bearings in addition to ball bearings. Obviously, while the invention has been described in relation to only two preferred embodiments, numerous variations, changes and substitutions of equivalents will present themselves to persons skilled in the art and may be made without necessarily departing from the scope and principles of this invention. As a result, the embodiments described herein are subject to various modifications, changes and the like, with the scope of this invention being determined solely be reference to the claims appended hereto.

What is claimed is:

1. In a four point contact rolling element bearing of the type used to rotatably mount a drive unit drivingly connected by suitable gearing to a ground engaging wheel, to any type of desired frame, and having an angular inner race connected with one of said drive unit and said frame and supported in an inner race retainer, a concentric annular outer race supported in an outer race retainer which is connected with the other of said drive unit and said frame, said inner and outer races being of integral construction and so spaced so as to define a rolling element path therebetween, with a plurality of rolling elements and rolling element spacers occupying said rolling element path wherein the improvement comprises:
   (a) one of said inner and outer races being provided with a single gap, said one of said races thus assuming the properties of an elastic open ring, said one of said races further having a peripheral conical surface on at least a portion of that peripheral surface that faces away from said rolling element path;
   (b) said race retainer associated with said one of said races having at least two relatively adjustable but fixedly interconnected portions;
   (c) means for physically spacing said race retainer portions from each other; and
   (d) one of said race retainer portions having a peripheral conical surface corresponding with and juxtaposed on the peripheral conical surface of said one of said races and only in radial contact with said one of said races, whereby a change in said means for spacing will change the spacing between said race retainer portions and consequently, via the interaction of said juxtaposed conical surfaces, deflect said one of said races toward said rolling element path and thus crowd said rolling elements against the other of said races to thereby preload said bearing or compensate for bearing wear.

2. The improved bearing of claim 1 wherein said one of said race that is provided with said gap is said outer race and said peripheral conical surface is located on the outer peripheral surface of said outer race.

3. The improved bearing of claim 1 wherein said one of said races that is provided with said gap is said inner race and said peripheral conical surface is located on the inner peripheral surface of said inner race.

4. The improved bearing of claim 1 wherein said means for spacing includes a plurality of shims interposed between said race retainer portions.

5. The improved bearing of claim 4 wherein a change in the number of said shims decreases the axial spacing between said race retainer portions.

6. The improved bearing of claim 1 wherein said other race retainer portion is only in axial contact with said one of said races.

7. The improved bearing of claim 1 wherein said single gap is perpendicular relative to said rolling element path.

8. In a four point contact rolling element bearing of the type having an annular inner race supported in an inner race retainer, a concentric outer race surrounding said inner race and supported in an outer race retainer, said inner and outer races being so spaced as to define a rolling element path therebetween, wherein the improvement comprises:
 (a) said outer race being of integral construction and provided with a single gap and having an outer peripheral conical surface, said outer race assuming the properties of an elastic open ring;
 (b) said outer race retainer having two relatively adjustable but fixedly interconnected portions;
 (c) a plurality of shims interposed between said outer race retainer portions for axially spacing said race retainer portions from each other; and
 (d) one of said outer race retainer portions having a peripheral conical surface corresponding with and juxtaposed on the peripheral conical surface of said outer race and only in radial contact with said outer race, whereby a decrease in the number of said shims will decrease the axial spacing between said outer race retainer portions and consequently, via the interaction of said juxtaposed conical surfaces, deflect said outer race toward said inner race thereby decreasing the radial extent of said rolling element path and thereby preloading said bearing or compensating for bearing wear.

9. The improved bearing of claim 8 wherein the other of said race retainer portions is only in axial contact with said outer race.

10. In a four point contact rolling element bearing of the type having an annular inner race supported in an inner race retainer, a concentric annular outer race surrounding said inner race and supported in an outer race retainer, wherein said outer race takes the form of a closed ring, said inner and outer races being of integral construction and so spaced so as to define a rolling element path therebetween, wherein the improvement comprises:
 (a) said inner race being provided with a single gap, thereby assuming the shape and properties of an elastic open ring, said inner race further having a peripheral conical surface on its inner peripheral surface;
 (b) said inner race retainer having at least two relatively axially adjustable but fixedly interconnected portions;
 (c) means for axially spacing said race retainer portions from each other; and
 (d) one of said race retainer portions having a peripheral conical surface corresponding with and juxtaposed on the peripheral conical surface of said inner race and only in radial contact with said inner race, whereby a change in said means for spacing will change the spacing between said race retainer portions and consequently, via the interaction of said juxtaposed conical surfaces, deflect said inner race toward said outer race thereby decreasing said rolling element path which in turn causes preloading of said bearing or permits compensation for bearing wear.

11. The improved bearing of claim 10 wherein said means for spacing includes a plurality of shims interposed between said race retainer portions.

* * * * *